(12) United States Patent
Bailey et al.

(10) Patent No.: US 8,088,449 B2
(45) Date of Patent: *Jan. 3, 2012

(54) REINFORCED SILICONE RESIN FILM AND METHOD OF PREPARING SAME

(75) Inventors: Debbie Bailey, Saginaw, MI (US); Dimitris Elias Katsoulis, Midland, MI (US); Michitaka Suto, Kanagawa (JP); Bizhong Zhu, Midland, MI (US)

(73) Assignees: Dow Corning Toray Co., Ltd., Tokyo (JP); Dow Corning Corporation, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/794,925

(22) PCT Filed: Feb. 1, 2006

(86) PCT No.: PCT/US2006/003535
§ 371 (c)(1), (2), (4) Date: Jul. 9, 2007

(87) PCT Pub. No.: WO2006/088645
PCT Pub. Date: Aug. 24, 2006

(65) Prior Publication Data
US 2008/0138525 A1 Jun. 12, 2008

Related U.S. Application Data

(60) Provisional application No. 60/653,305, filed on Feb. 16, 2005.

(51) Int. Cl.
*B05D 3/02* (2006.01)
(52) U.S. Cl. .................. 427/387; 427/385.5; 427/389.8
(58) Field of Classification Search ............... 427/385.5, 427/389.8
See application file for complete search history.

(56) References Cited

U.S. PATENT DOCUMENTS

| | | | |
|---|---|---|---|
| 736,971 A | 8/1903 | Jenkins |
| 2,702,764 A | 2/1955 | Painter et al. |
| 2,915,475 A | 12/1959 | Bugosh et al. |
| 3,031,417 A | 4/1962 | Bruce |
| 3,419,593 A | 12/1968 | Willing et al. |
| 3,445,420 A | 5/1969 | Kookootsedes et al. |
| 4,087,585 A | 5/1978 | Schulz |
| 4,260,780 A | 4/1981 | West |
| 4,273,697 A | 6/1981 | Sumimura et al. |
| 4,276,424 A | 6/1981 | Peterson, Jr. et al. |
| 4,314,956 A | 2/1982 | Baney et al. |
| 4,324,901 A | 4/1982 | West et al. |
| 4,332,525 A | 6/1982 | Cheney, Jr. |
| 4,395,443 A | 7/1983 | Shimizu et al. |
| 4,460,638 A | 7/1984 | Haluska |
| 4,460,639 A | 7/1984 | Chi et al. |
| 4,460,640 A | 7/1984 | Chi et al. |
| 4,500,447 A | 2/1985 | Kobayashi et al. |
| 4,510,094 A | 4/1985 | Drahnak et al. |
| 4,530,879 A | 7/1985 | Drahnak et al. |
| 4,537,829 A | 8/1985 | Blizzard et al. |
| 4,568,566 A | 2/1986 | Tolentino |
| 4,618,666 A | 10/1986 | Porte |
| 4,761,454 A | 8/1988 | Oba et al. |
| 4,766,176 A | 8/1988 | Lee et al. |
| 4,898,689 A | 2/1990 | Hamada et al. |
| 4,916,169 A | 4/1990 | Boardman et al. |
| 4,952,658 A | 8/1990 | Kalchauer et al. |
| 5,017,654 A | 5/1991 | Togashi et al. |
| 5,135,980 A | 8/1992 | Watanabe |
| 5,166,287 A | 11/1992 | Kalchauer et al. |
| 5,194,649 A | 3/1993 | Okawa |
| 5,213,868 A | 5/1993 | Liberty et al. |
| 5,256,480 A | 10/1993 | Inoue et al. |
| 5,278,272 A | 1/1994 | Lai et al. |
| 5,281,455 A | 1/1994 | Braun et al. |
| 5,283,309 A | 2/1994 | Morita |
| 5,310,843 A | 5/1994 | Morita |
| 5,312,946 A | 5/1994 | Stank et al. |
| 5,358,983 A | 10/1994 | Morita |
| 5,371,139 A | 12/1994 | Yokoyama et al. |
| 5,468,826 A | 11/1995 | Gentle et al. |

(Continued)

FOREIGN PATENT DOCUMENTS
CN 1528000 A 9/2004
(Continued)

OTHER PUBLICATIONS

"Development of Silicone Substrates to be used with CIGS Deposition," Government Report: AFRL-SR-AR-TR-05, published Apr. 29, 2005.

(Continued)

*Primary Examiner* — Dah-Wei Yuan
*Assistant Examiner* — Robert S Walters, Jr.
(74) *Attorney, Agent, or Firm* — Howard & Howard Attorneys PLLC

(57) ABSTRACT

A method of preparing a reinforced silicone resin film, the method comprising the steps of impregnating a fiber reinforcement in a condensation-curable silicone composition comprising a silicone resin, and curing the silicone resin in the condensation-curable silicone composition of the impregnated fiber reinforcement; wherein the reinforced silicone resin film comprises from 10 to 99% (w/w) of the cured silicone resin and the film has a thickness of from 15 to 500 µm; and a reinforced silicone resin film prepared according to the method.

12 Claims, No Drawings

U.S. PATENT DOCUMENTS

| | | | |
|---|---|---|---|
| 5,468,827 | A | 11/1995 | Morita |
| 5,474,608 | A | 12/1995 | Beisswanger |
| 5,486,588 | A | 1/1996 | Morita |
| 5,496,961 | A | 3/1996 | Dauth et al. |
| 5,530,075 | A | 6/1996 | Morita |
| 5,580,915 | A | 12/1996 | Lin |
| 5,581,008 | A | 12/1996 | Kobayashi |
| 5,738,976 | A | 4/1998 | Okinoshima et al. |
| 5,747,608 | A | 5/1998 | Katsoulis et al. |
| 5,794,649 | A | 8/1998 | Spear et al. |
| 5,801,262 | A | 9/1998 | Adams |
| 5,824,761 | A | 10/1998 | Bujanowski et al. |
| 5,861,467 | A | 1/1999 | Bujanowski et al. |
| 5,904,796 | A | 5/1999 | Freuler et al. |
| 5,959,038 | A | 9/1999 | Furukawa et al. |
| 5,972,512 | A | 10/1999 | Boisvert et al. |
| 6,046,283 | A | 4/2000 | Katsoulis et al. |
| 6,194,063 | B1 | 2/2001 | Oura et al. |
| 6,204,301 | B1 | 3/2001 | Oshima et al. |
| 6,287,639 | B1 | 9/2001 | Schmidt et al. |
| 6,297,305 | B1 | 10/2001 | Nakata et al. |
| 6,310,146 | B1 | 10/2001 | Katsoulis et al. |
| 6,352,610 | B1 | 3/2002 | Schmidt et al. |
| 6,368,535 | B1 * | 4/2002 | Katsoulis et al. ............. 264/236 |
| 6,376,078 | B1 | 4/2002 | Inokuchi |
| 6,378,599 | B1 | 4/2002 | Schmidt et al. |
| 6,387,487 | B1 | 5/2002 | Greenberg et al. |
| 6,407,922 | B1 | 6/2002 | Eckblad et al. |
| 6,432,497 | B2 | 8/2002 | Bunyan |
| 6,451,869 | B1 | 9/2002 | Butts |
| 6,617,674 | B2 | 9/2003 | Becker et al. |
| 6,644,395 | B1 | 11/2003 | Bergin |
| 6,652,958 | B2 | 11/2003 | Tobita |
| 6,656,425 | B1 | 12/2003 | Benthien et al. |
| 6,660,395 | B2 | 12/2003 | McGarry et al. |
| 6,689,859 | B2 | 2/2004 | Li et al. |
| 6,730,731 | B2 | 5/2004 | Tobita et al. |
| 6,783,692 | B2 | 8/2004 | Bhagwagar |
| 6,791,839 | B2 | 9/2004 | Bhagwagar |
| 6,831,145 | B2 | 12/2004 | Kleyer et al. |
| 6,838,005 | B2 | 1/2005 | Tepper |
| 6,841,213 | B2 | 1/2005 | Parsonage et al. |
| 6,884,314 | B2 | 4/2005 | Cross et al. |
| 6,902,688 | B2 | 6/2005 | Narayan et al. |
| 6,908,682 | B2 | 6/2005 | Mistele |
| 7,029,603 | B2 | 4/2006 | Wang et al. |
| 7,037,592 | B2 | 5/2006 | Zhu et al. |
| 7,132,062 | B1 | 11/2006 | Howard |
| 7,147,367 | B2 | 12/2006 | Balian et al. |
| 7,163,720 | B1 | 1/2007 | Dhaler et al. |
| 7,253,442 | B2 | 8/2007 | Huang et al. |
| 7,311,967 | B2 | 12/2007 | Dani et al. |
| 7,339,012 | B2 | 3/2008 | Prasse |
| 7,381,470 | B2 | 6/2008 | Suto et al. |
| 7,459,192 | B2 | 12/2008 | Parsonage et al. |
| 7,563,515 | B2 | 7/2009 | Ekeland et al. |
| 7,622,159 | B2 | 11/2009 | Mertz et al. |
| 7,658,983 | B2 | 2/2010 | Mormont et al. |
| 7,799,842 | B2 | 9/2010 | Anderson et al. |
| 7,850,870 | B2 | 12/2010 | Ahn et al. |
| 2003/0047718 | A1 | 3/2003 | Narayan et al. |
| 2003/0077478 | A1 | 4/2003 | Dani et al. |
| 2003/0096104 | A1 | 5/2003 | Tobita et al. |
| 2003/0170418 | A1 * | 9/2003 | Mormont et al. ............... 428/74 |
| 2003/0175533 | A1 | 9/2003 | McGarry et al. |
| 2003/0213939 | A1 | 11/2003 | Narayan |
| 2004/0053059 | A1 | 3/2004 | Mistele |
| 2004/0089851 | A1 | 5/2004 | Wang et al. |
| 2004/0101679 | A1 | 5/2004 | Mertz et al. |
| 2004/0126526 | A1 | 7/2004 | Parsonage et al. |
| 2004/0166332 | A1 | 8/2004 | Zhu et al. |
| 2005/0113749 | A1 | 5/2005 | Parsonage et al. |
| 2005/0227091 | A1 | 10/2005 | Suto et al. |
| 2005/0281997 | A1 | 12/2005 | Grah |
| 2007/0020468 | A1 | 1/2007 | Ekeland et al. |
| 2007/0120100 | A1 | 5/2007 | Glatkowski et al. |
| 2007/0246245 | A1 | 10/2007 | Ahn et al. |
| 2008/0051548 | A1 | 2/2008 | Bailey et al. |
| 2008/0138525 | A1 | 6/2008 | Bailey et al. |
| 2009/0005499 | A1 | 1/2009 | Fisher et al. |
| 2009/0090413 | A1 | 4/2009 | Katsoulis et al. |
| 2009/0105362 | A1 | 4/2009 | Anderson et al. |
| 2009/0155577 | A1 | 6/2009 | Anderson et al. |
| 2009/0246499 | A1 | 10/2009 | Katsoulis et al. |
| 2010/0028643 | A1 | 2/2010 | Zhu |
| 2010/0062247 | A1 | 3/2010 | Fisher et al. |
| 2010/0068538 | A1 | 3/2010 | Fisher |
| 2010/0075127 | A1 | 3/2010 | Fisher et al. |
| 2010/0086760 | A1 | 4/2010 | Zhu |
| 2010/0087581 | A1 | 4/2010 | Fisher et al. |
| 2010/0112321 | A1 | 5/2010 | Zhu |
| 2010/0129625 | A1 | 5/2010 | Zhu |
| 2010/0143686 | A1 | 6/2010 | Zhu |
| 2010/0209687 | A1 | 8/2010 | Zhu |
| 2010/0233379 | A1 | 9/2010 | Fisher et al. |
| 2010/0280172 | A1 | 11/2010 | Zhu |

FOREIGN PATENT DOCUMENTS

| | | | |
|---|---|---|---|
| CN | 1558931 | A | 12/2004 |
| CN | 1676568 | A | 10/2005 |
| DE | 19647368 | | 5/1998 |
| DE | 19915378 | A1 | 10/2000 |
| DE | 4033157 | | 9/2003 |
| EP | 0126535 | A1 | 11/1984 |
| EP | 0358452 | A2 | 3/1990 |
| EP | 0480680 | A1 | 4/1992 |
| EP | 0566311 | A2 | 10/1993 |
| EP | 0562922 | B1 | 5/1997 |
| EP | 0850998 | * | 7/1998 |
| EP | 0936250 | A2 | 8/1999 |
| EP | 1050538 | A2 | 11/2000 |
| EP | 1065248 | A2 | 1/2001 |
| EP | 1454962 | A1 | 9/2004 |
| EP | 1391492 | B1 | 6/2006 |
| FR | 2564470 | A1 | 11/1985 |
| GB | 736971 | | 9/1955 |
| JP | 59-096122 | | 6/1984 |
| JP | 10001549 | | 1/1998 |
| JP | 2004-339427 | A | 12/2004 |
| JP | 2007-090817 | A | 4/2007 |
| TW | 2004/18964 | A | 10/2004 |
| WO | 94/17003 | A1 | 8/1994 |
| WO | 02/082468 | A1 | 10/2002 |
| WO | WO02/085612 | * | 10/2002 |
| WO | 03/078079 | A1 | 9/2003 |
| WO | 03/099828 | A1 | 12/2003 |
| WO | 2004/035661 | A1 | 4/2004 |
| WO | 2004/060472 | A1 | 7/2004 |
| WO | 2004/106420 | A2 | 12/2004 |
| WO | 2005/114324 | A2 | 12/2005 |
| WO | 2006/088645 | A1 | 8/2006 |
| WO | 2006/088646 | A1 | 8/2006 |
| WO | 2007/013135 | A1 | 2/2007 |
| WO | 2007/018756 | A1 | 2/2007 |
| WO | 2007/092118 | A2 | 8/2007 |
| WO | 2007/097835 | A2 | 8/2007 |
| WO | 2007/121006 | A2 | 10/2007 |
| WO | 2007/123901 | A1 | 11/2007 |
| WO | 2008/013611 | A1 | 1/2008 |
| WO | 2008/013612 | A1 | 1/2008 |
| WO | 2008/045104 | A2 | 4/2008 |
| WO | 2008/051242 | A2 | 5/2008 |
| WO | 2009/007786 | A2 | 1/2009 |

OTHER PUBLICATIONS

English language abstract of JP 59-096122 extracted from espacenet.com database dated Aug. 26, 2011; 1 page.

English language abstract of FR 2564470 extracted from espacenet.com database dated Oct. 12, 2010; 2 pages.

English language abstract of DE 19647368 extracted from espacenet.com database dated Aug. 26, 2011; 1 page.

English language abstract of DE 19915378 extracted from espacenet.com database dated Aug. 26, 2011; 1 page.

English language abstract of DE 4033157 extracted from espacenet.com database dated Aug. 26, 2011; 1 page.

English language abstract of CN 1528000 extracted from espacenet.com database dated Sep. 23, 2010; 1 page.
English language abstract of TW 2004/18964 dated Sep. 23, 2010; 3 pages.
English language translation and abstract for JP 2004-339427 extracted from PAJ database, dated Oct. 15, 2010, 51 pages.
English language abstract of CN 1558931 extracted from espacenet.com database dated Aug. 26, 2011; 1 page.
English language abstract of CN 1676568 extracted from espacenet.com database dated Mar. 1, 2011; 1 page.
English language abstract of JP 2007-090817 extracted from espacenet.com database dated Aug. 26, 2011; 1 page.

Guo, Andrew, et al., "Highly Active Visible-Light Photocatalysts for Curing a Ceramic Precursor," Chemical Materials, 1998, pp. 531-536, vol. 10, American Chemical Society.
Zhu, H.Y., "Novel synthesis of aluminum oxide nanofibers," Materials Research Society Symposium Proceedings, vol. 703, held Nov. 26-29, 2001, Nanophase and Nanocomposite Materials IV. Symposium, published 2002, pp. 25-30, Materials Research Society, Warrendale, Pennsylvania, USA.
Frogley, Mark D. et al., "Mechanical Properties of Carbon Nanoparticle-reinforced Elastomers", Composites Science and Technology, 2003, pp. 1647-1654, vol. 63, Elsevier Ltd.

* cited by examiner

REINFORCED SILICONE RESIN FILM AND METHOD OF PREPARING SAME

CROSS REFERENCE TO RELATED APPLICATIONS

This application is a U.S. national stage filing under 35 U.S.C. §371 of PCT Application No. PCT/US06/03535 filed on 01 Feb. 2006, currently pending, which claims the benefit of U.S. Provisional Patent Application No. 60/653,305 filed 16 February 2005 under 35 U.S.C. §119 (e). PCT Application No. PCT/US06/03535 and U.S. Provisional Patent Application No. 60/653,305 are hereby incorporated by reference.

FIELD OF THE INVENTION

The present invention relates to a method of preparing a reinforced silicone resin film and more particularly to a method comprising impregnating a fiber reinforcement in a condensation-curable silicone composition comprising a silicone resin, and curing the silicone resin of the impregnated fiber reinforcement. The present invention also relates to a reinforced silicone resin film prepared according to the method.

BACKGROUND OF THE INVENTION

Silicone resins are useful in a variety of applications by virtue of their unique combination of properties, including high thermal stability, good moisture resistance, excellent flexibility, high oxygen resistance, low dielectric constant, and high transparency. For example, silicone resins are widely used as protective or dielectric coatings in the automotive, electronic, construction, appliance, and aerospace industries.

Although silicone resin coatings can be used to protect, insulate, or bond a variety of substrates, free standing silicone resin films have limited utility due to low tear strength, high brittleness, low glass transition temperature, and high coefficient of thermal expansion. Consequently, there is a need for free standing silicone resin films having improved mechanical and thermal properties.

SUMMARY OF THE INVENTION

The present invention is directed to a method of preparing a reinforced silicone resin film, the method comprising the steps of:
impregnating a fiber reinforcement in a condensation-curable silicone composition comprising a silicone resin; and
curing the silicone resin of the impregnated fiber reinforcement; wherein the reinforced silicone resin film comprises from 10 to 99% (w/w) of the cured silicone resin and the film has a thickness of from 15 to 500 µm.

The present invention is also directed to a reinforced silicone resin film prepared according to the aforementioned method.

The reinforced silicone resin film of the present invention has low coefficient of thermal expansion, high tensile strength, and high modulus compared to an un-reinforced silicone resin film prepared from the same silicone composition. Also, although the reinforced and un-reinforced silicone resin films have comparable glass transition temperatures, the reinforced film exhibits a much smaller change in modulus in the temperature range corresponding to the glass transition.

The reinforced silicone resin film of the present invention is useful in applications requiring films having high thermal stability, flexibility, mechanical strength, and transparency. For example, the silicone resin film can be used as an integral component of flexible displays, solar cells, flexible electronic boards, touch screens, fire-resistant wallpaper, and impact-resistant windows. The film is also a suitable substrate for transparent or nontransparent electrodes.

DETAILED DESCRIPTION OF THE INVENTION

A method of preparing a reinforced silicone resin film according to the present invention comprises the steps of:
impregnating a fiber reinforcement in a condensation-curable silicone composition comprising a silicone resin; and
curing the silicone resin of the impregnated fiber reinforcement; wherein the reinforced silicone resin film comprises from 10 to 99% (w/w) of the cured silicone resin and the film has a thickness of from 15 to 500 µm.

In the first step of the method of preparing a reinforced silicone resin film, a fiber reinforcement is impregnated in a condensation-curable silicone composition comprising a silicone resin.

The condensation-curable silicone composition can be any condensation-curable silicone composition comprising a silicone resin. Such compositions typically contain a silicone resin having silicon-bonded hydroxy or hydrolysable groups and, optionally, a cross-linking agent having silicon-bonded hydrolysable groups and/or a condensation catalyst. The silicone resin is typically a copolymer containing T siloxane units, or T and/or Q siloxane units in combination with M and/or D siloxane units. Moreover, the silicone resin can be a rubber-modified silicone resin, described below for the second embodiment of the silicone composition.

According to a first embodiment, the condensation-curable silicone composition comprises a silicone resin having the formula $(R^1R^2{}_2SiO_{1/2})_w(R^2{}_2SiO_{2/2})_x(R^2SiO_{3/2})_y(SiO_{4/2})_z$ (I), wherein $R^1$ is $C_1$ to $C_{10}$ hydrocarbyl or $C_1$ to $C_{10}$ halogen-substituted hydrocarbyl, $R^2$ is $R^1$, —H, —OH, or a hydrolysable group, w is from 0 to 0.8, x is from 0 to 0.6, y is from 0 to 0.99, z is from 0 to 0.35, w+x+y+z=1, y+z/(w+x+y+z) is from 0.2 to 0.99, and w+x/(w+x+y+z) is from 0 to 0.8, provided when y is 0, w+x/(w+x+y+z) is from 0.05 to 0.8, and the silicone resin has an average of at least two silicon-bonded hydrogen atoms, hydroxy groups, or hydrolysable groups per molecule.

The hydrocarbyl and halogen-substituted hydrocarbyl groups represented by $R^1$ typically have from 1 to 10 carbon atoms, alternatively from 1 to 6 carbon atoms, alternatively from 1 to 4 carbon atoms. Acyclic hydrocarbyl and halogen-substituted hydrocarbyl groups containing at least 3 carbon atoms can have a branched or unbranched structure. Examples of hydrocarbyl groups represented by $R^1$ include, but are not limited to, alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl, such as cyclopentyl, cyclohexyl, and methylcyclohexyl; aryl, such as phenyl and naphthyl; alkaryl, such as tolyl and xylyl; aralkyl, such as benzyl and phenethyl; alkenyl, such as vinyl, allyl, and propenyl; arylalkenyl, such as styryl and cinnamyl; and alkynyl, such as ethynyl and propynyl. Examples of halogen-substituted hydrocarbyl groups represented by $R^1$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl.

As used herein the term "hydrolysable group" means the silicon-bonded group reacts with water in the absence of a catalyst at any temperature from room temperature (~23±2° C.) to 100° C. within several minutes, for example thirty minutes, to form a silanol (Si-OH) group. Examples of hydrolysable groups represented by $R^2$ include, but are not limited to, —Cl, —Br, —$OR^3$, —$OCH_2CH_2OR^3$, $CH_3C(=O)O$—, $Et(Me)C=N$—$O$—, $CH_3C(=O)N(CH_3)$—, and —$ONH_2$, wherein $R^3$ is $C_1$ to $C_8$ hydrocarbyl or $C_1$ to $C_8$ halogen-substituted hydrocarbyl.

The hydrocarbyl and halogen-substituted hydrocarbyl groups represented by $R^3$ typically have from 1 to 8 carbon atoms, alternatively from 3 to 6 carbon atoms. Acyclic hydrocarbyl and halogen-substituted hydrocarbyl groups containing at least 3 carbon atoms can have a branched or unbranched structure. Examples of hydrocarbyl groups represented by $R^3$ include, but are not limited to, unbranched and branched alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, and octyl; cycloalkyl, such as cyclopentyl, cyclohexyl, and methylcyclohexyl; phenyl; alkaryl, such as tolyl and xylyl; aralkyl, such as benzyl and phenethyl; alkenyl, such as vinyl, allyl, and propenyl; arylalkenyl, such as styryl; and alkynyl, such as ethynyl and propynyl. Examples of halogen-substituted hydrocarbyl groups represented by $R^3$ include, but are not limited to, 3,3,3-trifluoropropyl, 3-chloropropyl, chlorophenyl, and dichlorophenyl.

In the formula (I) of the silicone resin, the subscripts w, x, y, and z are mole fractions. The subscript w typically has a value of from 0 to 0.8, alternatively from 0.02 to 0.75, alternatively from 0.05 to 0.3; the subscript x typically has a value of from 0 to 0.6, alternatively from 0 to 0.45, alternatively from 0 to 0.25; the subscript y typically has a value of from 0 to 0.99, alternatively from 0.25 to 0.8, alternatively from 0.5 to 0.8; the subscript z typically has a value of from 0 to 0.35, alternatively from 0 to 0.25, alternatively from 0 to 0.15. Also, the ratio y+z/(w+x+y+z) is typically from 0.2 to 0.99, alternatively from 0.5 to 0.95, alternatively from 0.65 to 0.9. Further, the ratio w+x/(w+x+y+z) is typically from 0 to 0.80, alternatively from 0.05 to 0.5, alternatively from 0.1 to 0.35. Still further, when y is 0, w+x/(w+x+y+z) is from 0.05 to 0.8, alternatively from 0.1 to 0.5.

Typically, at least 50 mol %, alternatively at least 65 mol %, alternatively at least 80 mol % of the groups $R^2$ in the silicone resin are hydrogen, hydroxy, or a hydrolysable group.

The silicone resin typically has a number-average molecular weight (Mn) of from 500 to 50,000, alternatively from 500 to 10,000, alternatively 1,000 to 3,000, where the molecular weight is determined by gel permeation chromatography employing a low angle laser light scattering detector, or a refractive index detector and silicone resin (MQ) standards.

The viscosity of the silicone resin at 25° C. is typically from 0.01 to 100,000 Pa·s, alternatively from 0.1 to 10,000 Pa·s, alternatively from 1 to 100 Pa·s.

The silicone resin can contain $R^2SiO_{3/2}$ units (i.e., T units), or $R^2SiO_{3/2}$ units (i.e., T units) and/or $SiO_{4/2}$ units (i.e., Q units) in combination with $R^1R^2_2SiO_{1/2}$ units (i.e., M units) and/or $R^2_2SiO_{2/2}$ units (i.e., D units), wherein $R^1$ and $R^2$ are as described and exemplified above. For example, the silicone resin can be a DT resin, an MT resin, an MDT resin, a DTQ resin, and MTQ resin, and MDTQ resin, a DQ resin, an MQ resin, a DTQ resin, an MTQ resin, or an MDQ resin.

Examples of silicone resins include, but are not limited to, resins having the following formulae:
$(MeSiO_{3/2})_n$, $(PhSiO_{3/2})_n$, $(Me_3SiO_{1/2})_{0.8}(SiO_{4/2})_{0.2}$, $(MeSiO_{3/2})_{0.67}(PhSiO_{3/2})_{0.33}$, $(MeSiO_{3/2})_{0.45}(PhSiO_{3/2})_{0.40}(Ph_2SiO_{2/2})_{0.1}(PhMeSiO_{2/2})_{0.05}$, $(PhSiO_{3/2})_{0.4}(MeSiO_{3/2})_{0.45}(PhSiO_{3/2})_{0.1}$ $(PhMeSiO_{2/2})_{0.05}$, and $(PhSiO_{3/2})_{0.4}(MeSiO_{3/2})_{0.1}(PhMeSiO_{2/2})_{0.5}$, where Me is methyl, Ph is phenyl, the numerical subscripts outside the parenthesis denote mole fractions, and the subscript n has a value such that the silicone resin has a number-average molecular weight of from 500 to 50,000. Also, in the preceding formulae, the sequence of units is unspecified.

The first embodiment of the condensation-curable silicone composition can comprise a single silicone resin or a mixture comprising two or more different silicone resins, each as described above.

Methods of preparing silicone resins containing silicon-bonded hydrogen atoms, hydroxy groups, or hydrolysable groups are well known in the art; many of these resins are commercially available. Silicone resins are typically prepared by cohydrolyzing the appropriate mixture of silane precursors in an organic solvent, such as toluene. For example, a silicone resin can be prepared by cohydrolyzing a silane having the formula $R^1R^2_2SiX$ and a silane having the formula $R^2SiX_3$ in toluene, where $R^1$ is $C_1$ to $C_{10}$ hydrocarbyl or $C_1$ to $C_{10}$ halogen-substituted hydrocarby, $R^2$ is $R^1$, —H, or a hydrolysable group, and X is a hydrolysable group, provided when $R^2$ is a hydrolysable group, X is more reactive in the hydrolysis reaction than $R^2$. The aqueous hydrochloric acid and silicone hydrolyzate are separated and the hydrolyzate is washed with water to remove residual acid and heated in the presence of a mild condensation catalyst to "body" (i.e., condense) the resin to the requisite viscosity. If desired, the resin can be further treated with a condensation catalyst in an organic solvent to reduce the content of silicon-bonded hydroxy groups.

The first embodiment of the condensation-curable silicone composition can comprise additional ingredients, provided the ingredient does not prevent the silicone resin from curing to form a cured silicone resin having low coefficient of thermal expansion, high tensile strength, and high modulus, as described below. Examples of additional ingredients include, but are not limited to, adhesion promoters; dyes; pigments; anti-oxidants; heat stabilizers; UV stabilizers; flame retardants; flow control additives; organic solvents, cross-linking agents, and condensation catalysts.

For example the silicone composition can further comprises a cross-linking agent and/or a condensation catalyst. The cross-linking agent can have the formula $R^3_qSiX_{4-q}$, wherein $R^3$ is $C_1$ to $C_8$ hydrocarbyl or $C_1$ to $C_8$ halogen-substituted hydrocarbyl, X is a hydrolysable group, and q is 0 or 1. The hydrocarbyl and halogen-substituted hydrocarbyl groups represented by $R^3$, and the hydrolysable groups represented by X are as described and exemplified above.

Examples of cross-linking agents include, but are not limited to, alkoxy silanes such as $MeSi(OCH_3)_3$, $CH_3Si(OCH_2CH_3)_3$, $CH_3Si(OCH_2CH_2CH_3)_3$, $CH_3Si[O(CH_2)_3CH_3]_3$, $CH_3CH_2Si(OCH_2CH_3)_3$, $C_6H_5Si(OCH_3)_3$, $C_6H_5CH_2Si(OCH_3)_3$, $C_6H_5Si(OCH_2CH_3)_3$, $CH_2=CHSi(OCH_3)_3$, $CH_2=CHCH_2Si(OCH_3)_3$, $CF_3CH_2CH_2Si(OCH_3)_3$, $CH_3Si(OCH_2CH_2OCH_3)_3$, $CF_3CH_2CH_2Si(OCH_2CH_2OCH_3)_3$, $CH_2=CHSi(OCH_2CH_2OCH_3)_3$, $CH_2=CHCH_2Si(OCH_2CH_2OCH_3)_3$, $C_6H_5Si(OCH_2CH_2OCH_3)_3$, $Si(OCH_3)_4$, $Si(OC_2H_5)_4$, and $Si(OC_3H_7)_4$; organoacetoxysilanes such as $CH_3Si(OCOCH_3)_3$, $CH_3CH_2Si(OCOCH_3)_3$, and $CH_2=CHSi(OCOCH_3)_3$; organoiminooxysilanes such as $CH_3Si[O$—

N=C(CH$_3$)CH$_2$CH$_3$]$_3$, Si[O—N=C(CH$_3$)CH$_2$CH$_3$]$_4$, and CH$_2$=CHSi[O—N=C(CH$_3$)CH$_2$CH$_3$]$_3$; organoacetamidosilanes such as CH$_3$Si[NHC(=O)CH$_3$]$_3$ and C$_6$H$_5$Si[NHC(=O)CH$_3$]$_3$; amino silanes such as CH$_3$Si[NH(s-C$_4$H$_9$)]$_3$ and CH$_3$Si(NHC$_6$H$_{11}$)$_3$; and organoaminooxysilanes.

The cross-linking agent can be a single silane or a mixture of two or more different silanes, each as described above. Also, methods of preparing tri- and tetra-functional silanes are well known in the art; many of these silanes are commercially available.

When present, the concentration of the cross-linking agent in the silicone composition is sufficient to cure (cross-link) the silicone resin. The exact amount of the cross-linking agent depends on the desired extent of cure, which generally increases as the ratio of the number of moles of silicon-bonded hydrolysable groups in the cross-linking agent to the number of moles of silicon-bonded hydrogen atoms, hydroxy groups, or hydrolysable groups in the silicone resin increases. Typically, the concentration of the cross-linking agent is sufficient to provide from 0.2 to 4 moles of silicon-bonded hydrolysable groups per mole of silicon-bonded hydrogen atoms, hydroxy groups, or hydrolysable groups in the silicone resin. The optimum amount of the cross-linking agent can be readily determined by routine experimentation.

As stated above, the first embodiment of the condensation-curable silicone composition can further comprise at least one condensation catalyst. The condensation catalyst can be any condensation catalyst typically used to promote condensation of silicon-bonded hydroxy (silanol) groups to form Si—O—Si linkages. Examples of condensation catalysts include, but are not limited to, amines; and complexes of lead, tin, zinc, and iron with carboxylic acids. In particular, the condensation catalyst can be selected from tin(II) and tin(IV) compounds such as tin dilaurate, tin dioctoate, and tetrabutyl tin; and titanium compounds such as titanium tetrabutoxide.

When present, the concentration of the condensation catalyst is typically from 0.1 to 10% (w/w), alternatively from 0.5 to 5% (w/w), alternatively from 1 to 3% (w/w), based on the total weight of the silicone resin.

When the silicone composition described above contains a condensation catalyst, the composition is typically a two-part composition where the silicone resin and condensation catalyst are in separate parts.

According to a second embodiment, the condensation-curable silicone composition comprises (A) a rubber-modified silicone resin prepared by reacting an organosilicon compound selected from (i) a silicone resin having the formula (R$^1$R$^4{}_2$SiO$_{1/2}$)$_w$(R$^4{}_2$SiO$_{2/2}$)$_x$(R$^4$SiO$_{3/2}$)$_y$(SiO$_{4/2}$)$_z$ (II) and (ii) hydrolysable precursors of (i), and a silicone rubber having the formula R$^5{}_3$SiO(R$^1$R$^5$SiO)$_m$SiR$^5{}_3$ (III) in the presence of water, a condensation catalyst, and an organic solvent to form a soluble reaction product, wherein R$^1$ is C$_1$ to C$_{10}$ hydrocarbyl or C$_1$ to C$_{10}$ halogen-substituted hydrocarbyl, R$^4$ is R$^1$, —OH, or a hydrolysable group, R$^5$ is R$^1$ or a hydrolysable group, m is from 2 to 1,000, w is from 0 to 0.8, x is from 0 to 0.6, y is from 0 to 0.99, z is from 0 to 0.35, w+x+y+z=1, y+z/(w+x+y+z) is from 0.2 to 0.99, and w+x/(w+x+y+z) is from 0 to 0.8, provided when y is 0, w+x/(w+x+y+z) is from 0.05 to 0.8, the silicone resin (II) has an average of at least two silicon-bonded hydroxy or hydrolysable groups per molecule, the silicone rubber (III) has an average of at least two silicon-bonded hydrolysable groups per molecule, and the mole ratio of silicon-bonded hydrolysable groups in the silicone rubber (III) to silicon-bonded hydroxy or hydrolysable groups in the silicone resin (II) is from 0.01 to 1.5; and (B) a condensation catalyst.

Component (A) is a rubber-modified silicone resin prepared by reacting an organosilicon compound selected from (i) at least one silicone resin having the formula (R$^1$R$^4{}_2$SiO$_{1/2}$)$_w$(R$^4{}_2$SiO$_{2/2}$)$_x$(R$^4$SiO$_{3/2}$)$_y$(SiO$_{4/2}$)$_z$ (II) and (ii) hydrolysable precursors of (i), and at least one silicone rubber having the formula R$^5{}_3$SiO(R$^1$R$^5$SiO)$_m$SiR$^5{}_3$ (III) in the presence of water, a condensation catalyst, and an organic solvent to form a soluble reaction product, wherein R$^1$, w, x, y, z, y+z/(w+x+y+z), and w+x/(w+x+y+z) are as described and exemplified above for the silicone resin having the formula (I), the hydrolysable groups represented by R$^4$ and R$^5$ are as described and exemplified above for R$^2$, and m has a value of from 2 to 1,000, provided the silicone resin (II) has an average of at least two silicon-bonded hydroxy or hydrolysable groups per molecule, the silicone rubber (III) has an average of at least two silicon-bonded hydrolysable groups per molecule, and the mole ratio of silicon-bonded hydrolysable groups in the silicone rubber (III) to silicon-bonded hydroxy or hydrolysable groups in the silicone resin (II) is from 0.01 to 1.5. As used herein, the term "soluble reaction product" means the product of the reaction for preparing component (A) is miscible in the organic solvent and does not form a precipitate or suspension.

Typically at least 50 mol %, alternatively at least 65 mol %, alternatively at least 80 mol % of the groups R$^4$ in the silicone resin (i) are hydroxy or hydrolysable groups.

The silicone resin (i) typically has a number-average molecular weight (M$_n$) of from 500 to 50,000, alternatively from 500 to 10,000, alternatively 1,000 to 3,000, where the molecular weight is determined by gel permeation chromatography employing a low angle laser light scattering detector, or a refractive index detector and silicone resin (MQ) standards.

The viscosity of the silicone resin (i) at 25° C. is typically from 0.01 to 100,000 Pa·s, alternatively from 0.1 to 10,000 Pa·s, alternatively from 1 to 100 Pa·s.

The silicone resin (i) can contain R$^4$SiO$_{3/2}$ units (i.e., T units), or R$^4$SiO$_{3/2}$ units (i.e., T units) and/or SiO$_{4/2}$ units (i.e., Q units) in combination with R$^1$R$^4{}_2$SiO$_{1/2}$ units (i.e., M units) and/or R$^4{}_2$SiO$_{2/2}$ units (i.e., D units), wherein R$^1$ and R$^4$ are as described and exemplified above. For example, the silicone resin (i) can be a DT resin, an MT resin, an MDT resin, a DTQ resin, and MTQ resin, and MDTQ resin, a DQ resin, an MQ resin, a DTQ resin, an MTQ resin, or an MDQ resin.

Examples of silicone resins suitable for use as silicone resin (i) include, but are not limited to, resins having the following formulae: (MeSiO$_{3/2}$)$_n$, (PhSiO$_{3/2}$)$_n$, (PhSiO$_{3/2}$)$_{0.4}$(MeSiO$_{3/2}$)$_{0.45}$(PhSiO$_{3/2}$)$_{0.1}$(PhMeSiO$_{2/2}$)$_{0.05}$, and (PhSiO$_{3/2}$)$_{0.3}$(SiO$_{4/2}$)$_{0.1}$(Me$_2$SiO$_{2/2}$)$_{0.2}$(Ph$_2$SiO$_{2/2}$)$_{0.4}$, where Me is methyl, Ph is phenyl, the numerical subscripts outside the parenthesis denote mole fractions, and the subscript n has a value such that the silicone resin has a number-average molecular weight of from 500 to 50,000. Also, in the preceding formulae, the sequence of units is unspecified.

Silicone resin (i) can be a single silicone resin or a mixture comprising two or more different silicone resins, each having the formula (II).

Methods of preparing silicone resins suitable for use as silicone resin (i) are well known in the art; many of these resins are commercially available. For example, silicone resins are typically prepared by cohydrolyzing the appropriate mixture of silane precursors in an organic solvent, such as toluene, as described above for the silicone resin having the formula (I).

The organosilicon compound can also be (ii) hydrolysable precursors of the silicone resin having the formula (II). As used herein, the term "hydrolysable precursors" refers to silanes having hydrolysable groups that are suitable for use as starting materials (precursors) for preparation of the silicone resin having the formula (II). The hydrolysable precursors can be represented by the formulae $R^1R^4_2SiX$, $R^4_2SiX_2$, $R^4SiX_3$, and $SiX_4$, wherein $R^1$ is $C_1$ to $C_{10}$ hydrocarbyl or $C_1$ to $C_{10}$ halogen-substituted hydrocarbyl, $R^4$ is $R^1$ or a hydrolysable group, and X is a hydrolysable group. Examples of hydrolysable precursors include, but are not limited to, silanes having the formulae: $Me_2ViSiCl$, $Me_3SiCl$, $MeSi(OEt)_3$, $PhSiCl_3$, $MeSiCl_3$, $Me_2SiCl_2$, $PhMeSiCl_2$, $SiC_4$, $Ph_2SiCl_2$, $PhSi(OMe)_3$, $MeSi(OMe)_3$, $PhMeSi(OMe)_2$, and $Si(OEt)_4$, wherein Me is methyl, Et is ethyl, and Ph is phenyl.

Methods of preparing silanes having hydrolysable groups are well known in the art; many of these compounds are commercially available.

In the formula (III) of the silicone rubber, $R^1$ and $R^5$ are as described and exemplified above, and the subscript m typically has a value of from 2 to 1,000, alternatively from 4 to 500, alternatively from 8 to 400.

Examples of silicone rubbers having the formula (III) include, but are not limited to, silicone rubbers having the following formulae: $(EtO)_3SiO(Me_2SiO)_{55}Si(OEt)_3$, $(EtO)_3SiO(Me_2SiO)_{16}Si(OEt)_3$, $(EtO)_3SiO(Me_2SiO)_{386}Si(OEt)_3$, and $(EtO)_2MeSiO(PhMeSiO)_{10}SiMe(OEt)_2$, wherein Me is methyl and Et is ethyl.

The silicone rubber having the formula (III) can be a single silicone rubber or a mixture comprising two or more different silicone rubbers, each having the formula (III). For example the silicone rubber can comprise a first silicone rubber having a dp (degree of polymerization), denoted by the value of m in formula III, of about 15 and a second silicone rubber having a dp of about 350.

Methods of preparing silicone rubbers containing silicon-bonded hydrolysable groups are well known in the art; many of these compounds are commercially available.

The condensation catalyst used in the preparation of the rubber-modified silicone resin of component (A) is as described and exemplified above for the first embodiment of the condensation-curable silicone composition. In particular, titanium compounds are suitable condensation catalysts for use in the preparation of component (A).

The organic solvent is at least one organic solvent. The organic solvent can be any aprotic or dipolar aprotic organic solvent that does not react with the organosilicon compound, the silicone rubber, or the rubber-modified silicone resin under the conditions for preparing component (A), described below, and is miscible with the aforementioned components.

Examples of organic solvents include, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; ketones such as methyl isobutyl ketone (MIBK); halogenated alkanes such as trichloroethane; and halogenated aromatic hydrocarbons such as bromobenzene and chlorobenzene. The organic solvent can be a single organic solvent or a mixture comprising two or more different organic solvents, each as defined above.

The organosilicon compound, the silicone rubber, condensation catalyst, and organic solvent can be combined in any order. Typically, the organosilicon compound, silicone rubber, and organic solvent are combined before the introduction of the condensation catalyst.

The mole ratio of silicon-bonded hydrolysable groups in the silicone rubber to silicon-bonded hydroxy or hydrolysable groups in the silicone resin having the formula (II) is typically from 0.01 to 1.5, alternatively from 0.05 to 0.8, alternatively from 0.2 to 0.5.

The concentration of water in the reaction mixture depends on the nature of the groups $R^4$ in the organosilicon compound and the nature of the silicon-bonded hydrolysable groups in the silicone rubber. When the organosilicon compound contains hydrolysable groups, the concentration of water is sufficient to effect hydrolysis of the hydrolysable groups in the organosilicon compound and the silicone rubber. For example, the concentration of water is typically from 0.01 to 3 moles, alternatively from 0.05 to 1 moles, per mole of hydrolysable group in the organosilicon compound and the silicone rubber combined. When the organosilicon compound does not contain hydrolysable groups, only a trace amount, e.g., 100 ppm, of water is required in the reaction mixture. Trace amounts of water are normally present in the reactants and/or solvent.

The concentration of the condensation catalyst is sufficient to catalyze the condensation reaction of the organosilicon compound with the silicone rubber. Typically, the concentration of the condensation catalyst is from 0.01 to 2% (w/w), alternatively from 0.01 to 1% (w/w), alternatively from 0.05 to 0.2% (w/w), based on the weight of the organosilicon compound.

The concentration of the organic solvent is typically from 10 to 95% (w/w), alternatively from 20 to 85% (w/w), alternatively from 50 to 80% (w/w), based on the total weight of the reaction mixture.

The reaction is typically carried out at a temperature of from room temperature (~23±2° C.) to 180° C., alternatively from room temperature to 100° C.

The reaction time depends on several factors, including the structures of the organosilicon compound and the silicone rubber, and the temperature. The components are typically allowed to react for a period of time sufficient to complete the condensation reaction. This means the components are allowed to react until at least 95 mol %, alternatively at least 98 mol %, alternatively at least 99 mol %, of the silicon-bonded hydrolysable groups originally present in the silicone rubber have been consumed in the condensation reaction, as determined by $^{29}Si$ NMR spectrometry. The time of reaction is typically from 1 to 30 h at a temperature of from room temperature (~23±2° C.) to 100° C. The optimum reaction time can be determined by routine experimentation using the methods set forth in the Examples section below.

The rubber-modified silicone resin can be used without isolation or purification in the second embodiment of the condensation-curable silicone composition or the resin can be separated from most of the solvent by conventional methods of evaporation. For example, the reaction mixture can be heated under reduced pressure.

Component (B) of the second embodiment of the condensation-curable silicone composition is at least one condensation catalyst, where the catalyst is as described and exemplified above for the first embodiment of the silicone composition. In particular, zinc compounds and amines are suitable for use as component (B) of the present silicone composition.

The concentration of component (B) is typically from 0.1 to 10% (w/w), alternatively from 0.5 to 5% (w/w), alternatively from 1 to 3% (w/w), based on the weight of component (A).

The second embodiment of the condensation-curable silicone composition can comprise additional ingredients, provided the ingredient does not prevent the silicone resin from curing to form a cured silicone resin having low coefficient of thermal expansion, high tensile strength, and high modulus, as described below. Examples of additional ingredients include, but are not limited to, adhesion promoters, dyes, pigments, anti-oxidants, heat stabilizers, UV stabilizers, flame retardants, flow control additives, cross-linking agents, and organic solvents.

For example the second embodiment of the condensation-curable silicone composition can further comprises a cross-linking agent having the formula $R^3_q SiX_{4-q}$, wherein $R^3$, X, and q are as described and exemplified above for the cross-linking agent of the first embodiment. The cross-linking agent can be a single silane or a mixture of two or more different silanes, each as described above.

When present, the concentration of the cross-linking agent in the second embodiment of the condensation-curable silicone composition is sufficient to cure (cross-link) the rubber-modified silicone resin of component (A). The exact amount of the cross-linking agent depends on the desired extent of cure, which generally increases as the ratio of the number of moles of silicon-bonded hydrolysable groups in the cross-linking agent to the number of moles of silicon-bonded hydroxy or hydrolysable groups in the rubber-modified silicone resin increases. Typically, the concentration of the cross-linking agent is sufficient to provide from 0.2 to 4 moles of silicon-bonded hydrolysable groups per mole of silicon-bonded hydroxy or hydrolysable groups in the rubber-modified silicone resin. The optimum amount of the cross-linking agent can be readily determined by routine experimentation.

The second embodiment of the condensation-curable silicone composition is typically a two-part composition, where the rubber-modified silicone rubber and the condensation catalyst are in separate parts.

The fiber reinforcement can be any reinforcement comprising fibers, provided the reinforcement has a high modulus and high tensile strength. The fiber reinforcement typically has a Young's modulus at 25° C. of at least 3 GPa. For example, the reinforcement typically has a Young's modulus at 25° C. of from 3 to 1,000 GPa, alternatively from 3 to 200 GPa, alternatively from 10 to 100 GPa. Moreover, the reinforcement typically has a tensile strength at 25° C. of at least 50 MPa. For example, the reinforcement typically has a tensile strength at 25° C. of from 50 to 10,000 MPa, alternatively from 50 to 1,000 MPa, alternatively from 50 to 500 MPa.

The fiber reinforcement can be a woven fabric, e.g., a cloth; a nonwoven fabric, e.g., a mat or roving; or loose (individual) fibers. The fibers in the reinforcement are typically cylindrical in shape and have a diameter of from 1 to 100 μm, alternatively from 1 to 20 μm, alternatively form 1 to 10 μm. Loose fibers may be continuous, meaning the fibers extend throughout the reinforced silicone resin film in a generally unbroken manner, or chopped.

The fiber reinforcement is typically heat-treated prior to use to remove organic contaminants. For example, the fiber reinforcement is typically heated in air at an elevated temperature, for example, 575° C., for a suitable period of time, for example 2 h.

Examples of fiber reinforcements include, but are not limited to reinforcements comprising glass fibers; quartz fibers; graphite fibers; nylon fibers; polyester fibers; aramid fibers, such as KEVLAR and NOMEX; polyethylene fibers; polypropylene fibers; and silicon carbide fibers.

The fiber reinforcement can be impregnated in the condensation-curable silicone composition using a variety of methods. For example, according to a first method, the fiber reinforcement can be impregnated by (i) applying a condensation-curable silicone composition to a release liner to form a silicone film; (ii) embedding a fiber reinforcement in the film; (iii) degassing the embedded fiber reinforcement; and (iv) applying the silicone composition to the degassed embedded fiber reinforcement to form an impregnated fiber reinforcement.

In step (i), a condensation-curable silicone composition, described above, is applied to a release liner to form a silicone film. The release liner can be any rigid or flexible material having a surface from which the reinforced silicone resin film can be removed without damage by delamination after the silicone resin is cured, as described below. Examples of release liners include, but are not limited to, Nylon, polyethyleneterephthalate, and polyimide.

The silicone composition can be applied to the release liner using conventional coating techniques, such as spin coating, dipping, spraying, brushing, or screen-printing. The silicone composition is applied in an amount sufficient to embed the fiber reinforcement in step (ii), below.

In step (ii), a fiber reinforcement is embedded in the silicone film. The fiber reinforcement can be embedded in the silicone film by simply placing the reinforcement on the film and allowing the silicone composition of the film to saturate the reinforcement.

In step (iii), the embedded fiber reinforcement is degassed. The embedded fiber reinforcement can be degassed by subjecting it to a vacuum at a temperature of from room temperature (~23±2° C.) to 60° C., for a period of time sufficient to remove entrapped air in the embedded reinforcement. For example, the embedded fiber reinforcement can typically be degassed by subjecting it to a pressure of from 1,000 to 20,000 Pa for 5 to 60 min. at room temperature.

In step (iv), the silicone composition is applied to the degassed embedded fiber reinforcement to form an impregnated fiber reinforcement. The silicone composition can be applied to the degassed embedded fiber reinforcement using conventional methods, as describe above for step (i).

The first method can further comprise the steps of (v) degassing the impregnated fiber reinforcement; (vi) applying a second release liner to the degassed impregnated fiber reinforcement to form an assembly; and (vii) compressing the assembly.

The assembly can be compressed to remove excess silicone composition and/or entrapped air, and to reduce the thickness of the impregnated fiber reinforcement. The assembly can be compressed using conventional equipment such as a stainless steel roller, hydraulic press, rubber roller, or laminating roll set. The assembly is typically compressed at a pressure of from 1,000 Pa to 10 MPa and at a temperature of from room temperature (~23±2° C.) to 50° C.

Alternatively, according to a second method, the fiber reinforcement can be impregnated in a condensation-curable silicone composition by (i) depositing a fiber reinforcement on a release liner; (ii) embedding the fiber reinforcement in a condensation-curable silicone composition; (iii) degassing the embedded fiber reinforcement; and (iv) applying the silicone composition to the degassed embedded fiber reinforcement to form an impregnated fiber reinforcement. The second method can further comprise the steps of (v) degassing the impregnated fiber reinforcement; (vi) applying a second release liner to the degassed impregnated fiber reinforcement to form an assembly; and (vii) compressing the assembly. In the second method, steps (iii) to (vii) are as described above for the first method of impregnating a fiber reinforcement in a condensation-curable silicone composition.

In step (ii), the fiber reinforcement is embedded in a condensation-curable silicone composition. The reinforcement can be embedded in the silicone composition by simply covering the reinforcement with the composition and allowing the composition to saturate the reinforcement.

Furthermore, when the fiber reinforcement is a woven or nonwoven fabric, the reinforcement can be impregnated in a condensation-curable silicone composition by passing it through the composition. The fabric is typically passed through the silicone composition at a rate of from 1 to 1,000 cm/s at room temperature (~23±2° C.).

In the second step of the method of preparing a reinforced silicone resin film, the silicone resin of the impregnated fiber reinforcement is cured. The conditions for curing the silicone resin depend on the nature of the silicon-bonded groups in the resin. For example, when the silicone resin of the impregnated fiber reinforcement does not contain silicon-bonded hydrogen atoms or hydrolysable groups, the silicone resin can be cured (i.e., cross-linked) by heating the impregnated fiber reinforcement. For example, the silicone resin can typically be cured by heating the impregnated fiber reinforcement at a temperature of from 50 to 250° C., for a period of from 1 to 50 h. When the silicone composition comprises a condensation catalyst, the silicone resin can typically be cured at a lower temperature, e.g., from room temperature (~23±2° C.) to 200° C.

Also, when the silicone resin of the impregnated fiber reinforcement contains silicon-bonded hydrogen atoms (e.g., silicone resin of the first embodiment of the silicone composition), the silicone resin can be cured by exposing the impregnated fiber reinforcement to moisture or oxygen at a temperature of from 100 to 450° C. for a period of from 0.1 to 20 h. When the silicone composition contains a condensation catalyst, the silicone resin can typically be cured at a lower temperature, e.g., from room temperature (∞23±2° C.) to 400° C.

Further, when the silicone resin of the impregnated fiber reinforcement contains silicon-bonded hydrolysable groups, the silicone resin can be cured by exposing the impregnated fiber reinforcement to moisture at a temperature of from room temperature (~23±2° C.) to 250° C., alternatively from 100 to 200° C., for a period of from 1 to 100 h. For example, the silicone resin can typically be cured by exposing the impregnated fiber reinforcement to a relative humidity of 30% at a temperature of from about room temperature (~23±2° C.) to 150° C., for period from 0.5 to 72 h. Cure can be accelerated by application of heat, exposure to high humidity, and/or addition of a condensation catalyst to the composition.

The silicone resin of the impregnated fiber reinforcement can be cured at atmospheric or subatmospheric pressure, depending on the method, described above, employed to impregnate the fiber reinforcement in the condensation-curable silicone composition. For example, when the impregnated fiber reinforcement is not enclosed between a first and second release liner, the silicone resin is typically cured at atmospheric pressure in air. Alternatively, when the impregnated fiber reinforcement is enclosed between a first and second release liner, the silicone resin is typically cured under reduced pressure. For example, the silicone resin can be heated under a pressure of from 1,000 to 20,000 Pa, alternatively from 1,000 to 5,000 Pa. The silicone resin can be cured under reduced pressure using a conventional vacuum bagging process. In a typically process, a bleeder (e.g., polyester) is applied over the impregnated fiber reinforcement, a breather (e.g, Nylon, polyester) is applied over the bleeder, a vacuum bagging film (e.g., Nylon) equipped with a vacuum nozzle is applied over the breather, the assembly is sealed with tape, a vacuum (e.g., 1,000 Pa) is applied to the sealed assembly and, if necessary, the evacuated assembly is heated as described above.

The reinforced silicone resin film of the present invention typically comprises from 10 to 99% (w/w), alternatively from 30 to 95% (w/w), alternatively from 60 to 95% (w/w), alternatively from 80 to 95% (w/w), of the cured silicone resin. Also, the reinforced silicone resin film typically has a thickness of from 15 to 500 µm, alternatively from 15 to 300 µm, alternatively from 20 to 150 µm, alternatively from 30 to 125 µm.

The reinforced silicone resin film typically has a flexibility such that the film can be bent over a cylindrical steel mandrel having a diameter less than or equal to 3.2 mm without cracking, where the flexibility is determined as described in ASTM Standard D522-93a, Method B.

The reinforced silicone resin film has low coefficient of linear thermal expansion (CTE), high tensile strength, and high modulus. For example the film typically has a CTE of from 0 to 80 µm/m° C., alternatively from 0 to 20 µm/m° C., alternatively from 2 to 10 µm/m° C., at temperature of from room temperature (~23±2° C.) to 200° C. Also, the film typically has a tensile strength at 25° C. of from 50 to 200 MPa, alternatively from 80 to 200 MPa, alternatively from 100 to 200 MPa. Further, the reinforced silicone resin film typically has a Young's modulus at 25° C. of from 2 to 10 GPa, alternatively from 2 to 6 GPa, alternatively from 3 to 5 GPa.

The transparency of the reinforced silicone resin film depends on a number of factors, such as the composition of the cured silicone resin, the thickness of the film, and the refractive index of the fiber reinforcement. The reinforced silicone resin film typically has a transparency (% transmittance) of at least 50%, alternatively at least 60%, alternatively at least 75%, alternatively at least 85%, in the visible region of the electromagnetic spectrum.

The method of the present invention can further comprise forming a coating on at least a portion of the reinforced silicone resin film. Examples of coatings include, but are not limited to, cured silicone resins prepared by curing hydrosilylation-curable silicone resins or condensation-curable silicone resins; cured silicone resins prepared by curing sols of organosilsesquioxane resins; inorganic oxides, such as indium tin oxide, silicon dioxide, and titanium dioxide; inorganic nitrides, such as silicon nitride and gallium nitride; metals, such as copper, silver, gold, nickel, and chromium; and silicon, such as amorphous silicon, microcrystalline silicon, and polycrystalline silicon.

The reinforced silicone resin film of the present invention has low coefficient of thermal expansion, high tensile strength, and high modulus compared to an un-reinforced silicone resin film prepared from the same silicone composition. Also, although the reinforced and un-reinforced silicone resin films have comparable glass transition temperatures, the reinforced film exhibits a much smaller change in modulus in the temperature range corresponding to the glass transition.

The reinforced silicone resin film of the present invention is useful in applications requiring films having high thermal stability, flexibility, mechanical strength, and transparency. For example, the silicone resin film can be used as an integral component of flexible displays, solar cells, flexible electronic boards, touch screens, fire-resistant wallpaper, and impact-resistant windows. The film is also a suitable substrate for transparent or nontransparent electrodes.

EXAMPLES

The following examples are presented to better illustrate the method and reinforced silicone resin film of the present invention, but are not to be considered as limiting the invention, which is delineated in the appended claims. Unless otherwise noted, all parts and percentages reported in the examples are by weight. The following methods and materials were employed in the examples:

Measurement of Mechanical Properties

Young's modulus, tensile strength, and tensile strain at break were measured using an MTS Alliance RT/5 testing frame, equipped with a 100-N load cell. Young's modulus, tensile strength, and tensile strain were determined at room temperature (~23±2° C.) for the test specimens of Examples 1-4.

The test specimen was loaded into two pneumatic grips spaced apart 25 mm and pulled at a crosshead speed of 1 mm/min. Load and displacement data were continuously collected. The steepest slope in the initial section of the load-displacement curve was taken as the Young's modulus. Reported values for Young's modulus (GPa), tensile strength (MPa), and tensile strain (%) each represent the average of three measurements made on different dumbbell-shaped test specimens from the same reinforced silicone resin film.

The highest point on the load-displacement curve was used to calculate the tensile strength according to the equation:

$$\sigma = F/(wb),$$

where:
$\sigma$=tensile strength, MPa,
F=highest force, N,
w=width of the test specimen, mm, and
b=thickness of the test specimen, mm.

The tensile strain at break was approximated by dividing the difference in grip separation before and after testing by the initial separation according to the equation:

$$\in = 100(l_2 - l_1)/l_1,$$

where:
$\in$=tensile strain at break, %,
$l_2$=final separation of the grips, mm, and
$l_1$=initial separation of the grips, mm.

WN150 Vacuum Bagging Film, sold by Airtech International, Inc. (Huntington Beach, Calif.), is a nylon bagging film having a thickness of 50 mm.

RE234 TFP Bleeder, sold by Airtech International, Inc. (Huntington Beach, Calif.), is a porous polytetrafluoroethylene coated style 1080 glass fabric having a thickness of 75 μm.

AIRWEAVE N-7 Breather, sold by Airtech International, Inc. (Huntington Beach, Calif.), is a medium weight 7 oz/yd² (237 g/m²) high melting point polyester breather.

Glass Fabric, which is available from JPS Glass (Slater, S.C.), is an untreated style 106 electrical glass fabric having a plain weave and a thickness of 37.5 μm.

RELISSE 2520, sold by Nano Film Inc. (Westlake Village, Calif.), is a mold release gel.

DOW CORNING 805 Resin, which is sold by Dow Corning Corporation (Midland, Mich.), is a solution containing 50% (w/w) of a silanol-functional silicone resin in xylene, where the resin has the formula $(PhMeSiO_{2/2})_{0.39}(Ph_2SiO_{2/2})_{0.07}(PhSiO_{3/2})_{0.35}(MeSiO_{3/2})_{0.19}$ and the resin contains about 1% (w/w) of silicon-bonded hydroxy (silanol) groups.

SDC Abrasion-resistant Coating PF1202, which is sold by SDC Technologies, Inc. (Anaheim, Calif.) is a solution containing 31% (w/w) of a silicone resin consisting essentially of $MeSiO_{3/2}$ units and $SiO_{4/2}$ units, and additives for coating polycarbonate, in a mixture of methanol, 2-propanol, and water.

SDC Abrasion-resistant Coating MP101, which is sold by SDC Technologies, Inc. (Anaheim, Calif.) is a solution containing 31% (w/w) of a silicone resin consisting essentially of $MeSiO_{3/2}$ units and $SiO_{4/2}$ units in a mixture of methanol, 2-propanol, and water.

Example 1

A glass plate (15.2 cm×15.2 cm) was treated with RELISSE 2520 release gel to render the surface hydrophobic, and the treated glass was then washed in mild aqueous detergent and rinsed with water to remove excess gel. DOW CORNING 805Resin was uniformly applied to the glass plate using a No. 24 MYLAR metering rod to form a silicone film. Glass fabric (17.8 cm×17.8 cm) was carefully laid down on the silicone film, allowing sufficient time for the composition to thoroughly wet the fabric. The embedded fabric was then degassed under vacuum (5.3 kPa) at room temperature for 0.5 h. DOW CORNING 805 Resin was then uniformly applied to the degassed embedded fabric and the degassing procedure was repeated. The impregnated glass fabric was covered with an RE234TFP Bleeder. The bleeder was covered with an AIRWEAVE N-7 Breather. WN1500 Vacuum Bagging Film, equipped with a vacuum nozzle, was applied over the breather, and the assembly as sealed with tape. The vacuum bag assembly was placed in an air-circulating oven and the vacuum bag was evacuated at a pressure of 1,000 Pa. The vacuum bag assembly was heated to 200 ° C. at a rate of 0.5 ° C/min. and then maintained at 200 ° C. for 1h. The oven was turned off and the assembly was allowed to cool to room temperature. Air was admitted into the bag. The reinforced silicone resin film was separated from the glass and polymer layers. The reinforced film had a uniform thickness (0.06-0.07 mm) and was substantially transparent and free of voids. The mechanical properties of the reinforced silicone resin film are shown in Table 1.

Example 2

A reinforced silicone resin film was prepared according to the method of Example 1, except a silanol-functional silicone resin consisting essentially of $MeSiO_{3/2}$ units and containing about 20% (w/w) of silicon-bonded hydroxy (silanol) groups, was substituted for the DOW CORNING 805 Resin, the degassing steps were carried out at a temperature of 50 ° C. for 0.5 h, and the vacuum bag assembly was heated under vacuum according to the following cycle: room temperature to 100 ° C. at 1 ° C./min., 100 ° C. for 2 h, 100 ° C. to 160 ° C. at 1 ° C./min., 160 ° C. for 2 h, 160 ° C. to 200 ° C. at 1 ° C./min., 200° C. for 2 h. The mechanical properties of the reinforced silicone resin film are shown in Table 1.

Example 3

A glass plate (15.2 cm×15.2 cm) was treated with RELISSE 2520 release gel to render the surface hydrophobic, and the treated glass was then washed in mild aqueous detergent and rinsed with water to remove excess gel. SDC Abrasion-resistant Coating PF1202 was uniformly applied to the glass plate using a No. 24 MYLAR metering rod to form a silicone film. Glass fabric (17.8 cm×17.8 cm) was carefully laid down on the silicone film, allowing sufficient time for the composition to thoroughly wet the fabric. The embedded fabric was then degassed under vacuum (5.3 kPa) at 50 ° C. for 0.5 h. SDC Abrasion-resistant Coating PF1202 was then uniformly applied to the degassed embedded fabric and the degassing procedure was repeated. The composite was heated in an air-circulating oven according to the following cycle: room temperature to 75 ° C. at 2.5 ° C./min., 75 ° C. for 1 h, 75 ° C. to 100 ° C. at 2.5 ° C./min., 100 ° C. for 1 h, 100 ° C. to 125 ° C. at 2.5 ° C/min., 125 ° C. for 1 h. The oven was turned off and the composite was allowed to cool to room temperature. The mechanical properties of the reinforced silicone resin film are shown in Table 1.

Example 4

Glass fabric (38.1 cm×8.9 cm) was impregnated with SDC Abrasion-resistant Coating MP101 by passing the fabric through the composition at a rate of about 5 cm/s. The impregnated fabric was then hung vertically in an air-circulating oven and heated according to the following cycle: room temperature to 75° C. at 1° C./min., 75° C. for 1 h, 75 ° C. to 100 ° C. at 1° C./min., 100° C. for 1 h, 100° C. to 125° C. at 1° C./min., 125° C. for 1 h. The oven was turned off and the reinforced silicone resin film was allowed to cool to room temperature. The mechanical properties of the reinforced silicone resin film are shown in Table 1.

TABLE 1

| Ex. | Thickness (mm) | Tensile Strength (MPa) Warp | Tensile Strength (MPa) Fill | Young's Modulus (GPa) Warp | Young's Modulus (GPa) Fill | Strain at Break (%) Warp | Strain at Break (%) Fill |
|---|---|---|---|---|---|---|---|
| 1 | 0.06–0.007 | 103.2 ± 6.9 | 10.5 ± 1.9 | 4.23 ± 0.08 | 2.11 ± 1.04 | 3.3 ± 0.1 | 8.0 ± 2.3 |
| 2 | 0.06–0.007 | 87.6 ± 5.8 | 87.4 ± 21.1 | 2.59 ± 0.32 | 3.61 ± 0.46 | 4.1 ± 0.1 | — |
| 3 | 0.06–0.007 | 92.5 ± 19.7 | 92.1 ± 9.9 | 2.65 ± 0.18 | 2.11 ± 0.30 | 4.3 ± 0.8 | 5.9 ± 0.8 |
| 4 | 0.06–0.007 | 114.2 ± 1.3 | 157.3 ± 23.2 | 2.87 ± 0.14 | 3.30 ± 0.85 | 6.3 ± 0.2 | 7.6 ± 0.7 |

— Denotes value not measured.

That which is claimed is:

1. A method of preparing a reinforced silicone resin film, the method comprising the steps of:
    impregnating a fiber reinforcement in a condensation-curable silicone composition comprising a silicone resin; and
    curing the silicone resin of the impregnated fiber reinforcement; wherein the reinforced silicone resin film comprises from 10 to 99% (w/w) of the cured silicone resin, and the film can be bent over a cylindrical steel mandrel having a diameter less than or equal to 3.2 mm in accordance with ASTM Standard D522-93a Method B without cracking;
    wherein the condensation-curable silicone composition comprises a silicone resin having the formula $(R^1R^2_2SiO_{1/2})_w(R^2_2SiO_{2/2})_x(R^2SiO_{3/2})_y(SiO_{4/2})_z$ (I), wherein $R^1$ is independently $C_1$ to $C_{10}$ hydrocarbyl or $C_1$ to $C_{10}$ halogen-substituted hydrocarbyl, $R^2$ is independently $R^1$, —H, —OH, or a hydrolysable group, w is from 0 to 0.8, x is from 0 to 0.6, y is from 0 to 0.99, z is from 0 to 0.35, $w+x+y+z=1$, $y+z/(w+x+y+z)$ is from 0.2 to 0.99, and $w+x/(w+x+y+z)$ is from 0 to 0.8, provided when y is 0, $w+x/(w+x+y+z)$ is from 0.05 to 0.8, and the silicone resin has an average of at least two silicon-bonded hydrogen atoms, hydroxyl groups, or hydrolysable groups per molecule.

2. The method according to claim 1, wherein the step of impregnating the fiber reinforcement comprises (i) applying a condensation-curable silicone composition to a release liner to form a silicone film; (ii) embedding a fiber reinforcement in the film; (iii) degassing the embedded fiber reinforcement; and (iv) applying the silicone composition to the degassed embedded fiber reinforcement to form an impregnated fiber reinforcement.

3. The method according to claim 1, wherein the step of impregnating the fiber reinforcement comprises (i) depositing a fiber reinforcement on a first release liner; (ii) embedding the fiber reinforcement in a condensation-curable silicone composition; (iii) degassing the embedded fiber reinforcement; and (iv) applying the silicone composition to the degassed embedded fiber reinforcement to form an impregnated fiber reinforcement.

4. The method according to claim 1, wherein the fiber reinforcement is a woven fabric or non-woven fabric and the step of impregnating the fiber reinforcement comprises passing the fabric through the condensation-curable silicone composition.

5. The method according to claim 1, further comprising forming a coating on at least a portion of the silicone resin film.

6. The method according to claim 5, wherein the coating is a cured silicone resin.

7. A method of preparing a reinforced silicone resin film, the method comprising the steps of:
    impregnating a fiber reinforcement in a condensation-curable silicone composition comprising a silicone resin; and
    curing the silicone resin of the impregnated fiber reinforcement; wherein the reinforced silicone resin film comprises from 10 to 99% (w/w) of the cured silicone resin, and the film can be bent over a cylindrical steel mandrel having a diameter less than or equal to 3.2 mm in accordance with ASTM Standard D522-93a Method B without cracking;
    wherein the condensation-curable silicone composition comprises (A) a rubber-modified silicone resin prepared by reacting an organosilicon compound selected from (i) a silicone resin having the formula $(R^1R^4_2SiO_{1/2})_w(R^4_2SiO_{2/2})_x(R^4SiO_{3/2})_y(SiO_{4/2})_z$ (II) and (ii) hydrolysable precursors of (i), and a silicone rubber having the formula $R^5_3SiO(R^1R^5SiO)mSiR^5_3$ (III) in the presence of water, a condensation catalyst, and an organic solvent to form a soluble reaction product, wherein $R^1$ is independently $C_1$ to $C_{10}$ hydrocarbyl or $C_1$ to $C_{10}$ halogen-substituted hydrocarbyl, $R^4$ independently is $R^1$, —OH, or a hydrolysable group, $R^5$ independently is $R^1$ or a hydrolysable group, m is from 2 to 1,000, w is from 0 to 0.8, x is from 0 to 0.6, y is from 0 to 0.99, z is from 0 to 0.35, $w+x+y+z=1$, $y+z/(w+x+y+z)$ is from 0.2 to 0.99, and $w+x/(w+x+y+z)$ is from 0 to 0.8, provided when y is 0, $w+x/(w+x+y+z)$ is from 0.05 to 0.8, the silicone resin (II) has an average of at least two silicon-bonded hydroxy or hydrolysable groups per molecule, the silicone rubber (III) has an average of at least two silicon bonded hydrolysable groups per molecule, and the mole ratio of silicon-bonded hydrolysable groups in the silicone rubber (III) to silicon-bonded hydroxy or hydrolysable groups in the silicone resin (II) is from 0.01 to 1.5; and (B) a condensation catalyst.

8. The method according to claim 7, wherein the step of impregnating the fiber reinforcement comprises (i) applying a condensation-curable silicone composition to a release liner to form a silicone film; (ii) embedding a fiber reinforcement in the film; (iii) degassing the embedded fiber reinforcement; and (iv) applying the silicone composition to the degassed embedded fiber reinforcement to form an impregnated fiber reinforcement.

9. The method according to claim 7, wherein the step of impregnating the fiber reinforcement comprises (i) depositing a fiber reinforcement on a first release liner; (ii) embedding the fiber reinforcement in a condensation-curable silicone composition; (iii) degassing the embedded fiber reinforcement; and (iv) applying the silicone composition to the degassed embedded fiber reinforcement to form an impregnated fiber reinforcement.

10. The method according to claim 7, wherein the fiber reinforcement is a woven fabric or non-woven fabric and the step of impregnating the fiber reinforcement comprises passing the fabric through the condensation-curable silicone composition.

11. The method according to claim 7, further comprising forming a coating on at least a portion of the silicone resin film.

12. The method according to claim 11, wherein the coating is a cured silicone resin.

* * * * *